Nov. 16, 1926.
F. FRASER
1,607,522
BLANK FOR OPHTHALMIC FRAMES AND METHOD OF FORMING THE SAME
Filed Oct. 25, 1923   2 Sheets-Sheet 1
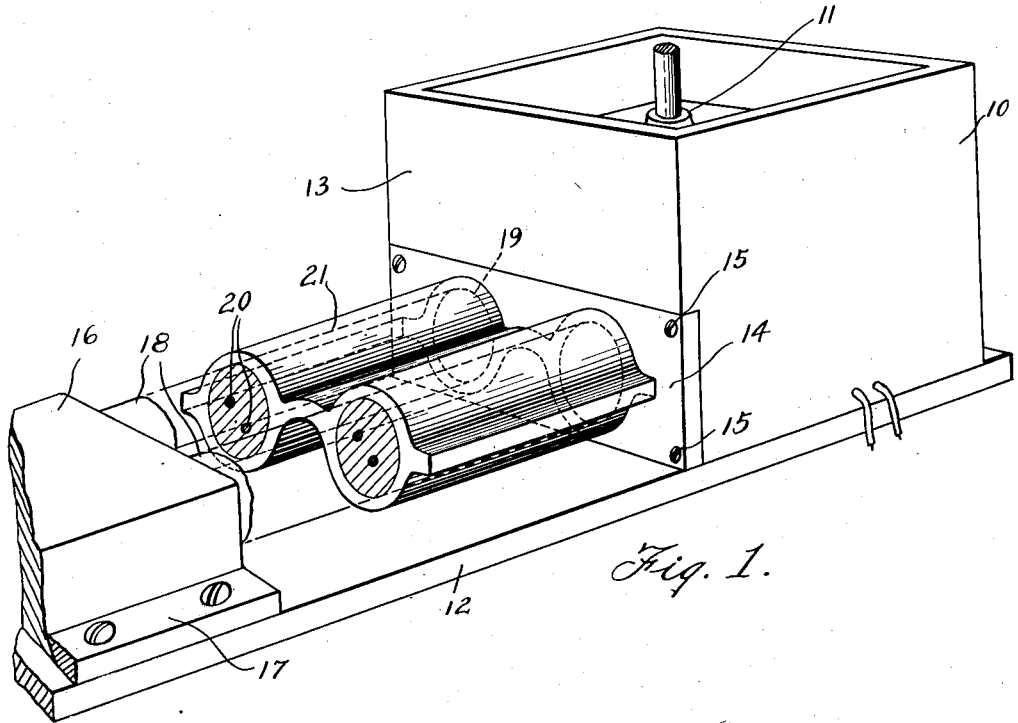
Fig. 1.
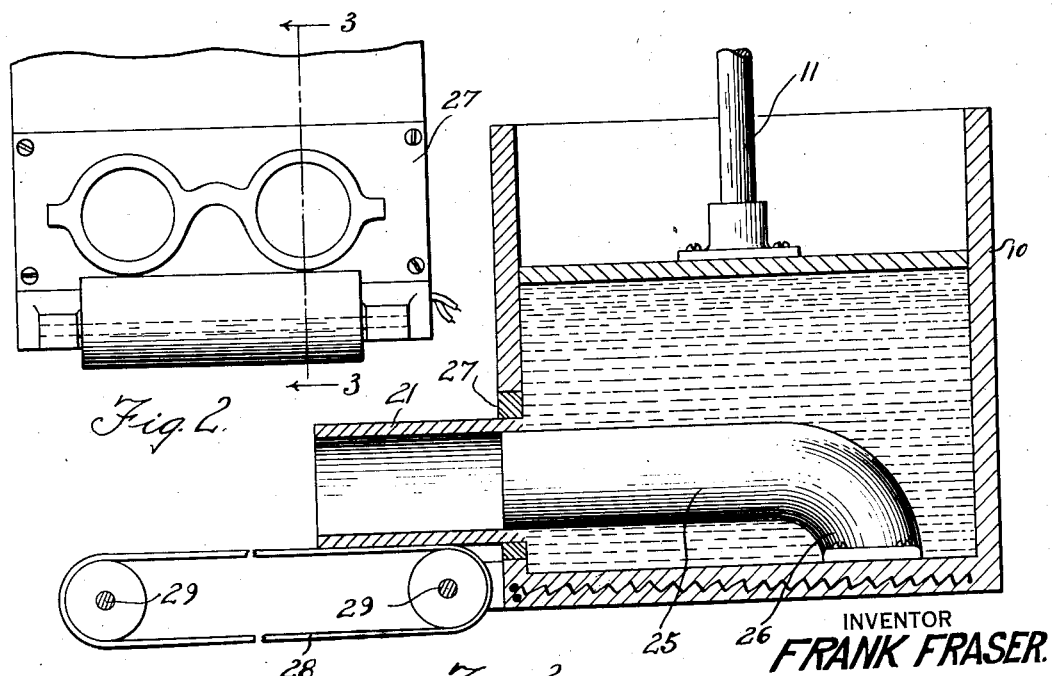
Fig. 2.
Fig. 3.
INVENTOR
FRANK FRASER.
BY
Harry H. Styll
ATTORNEY Nov. 16, 1926.
F. FRASER
1,607,522
BLANK FOR OPHTHALMIC FRAMES AND METHOD OF FORMING THE SAME
Filed Oct. 25, 1923  2 Sheets-Sheet 2
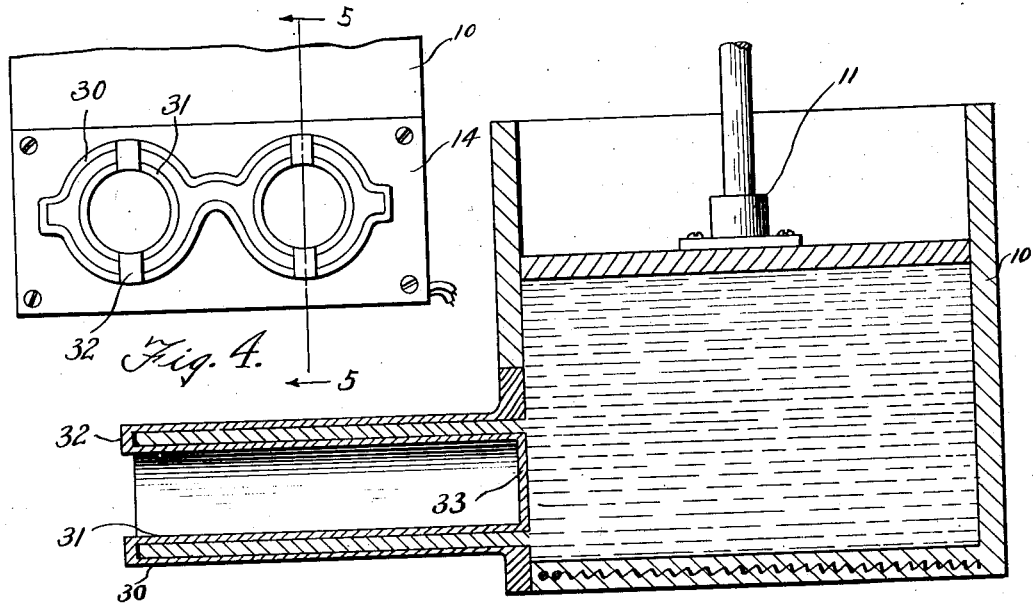
Fig. 4.
Fig. 5.
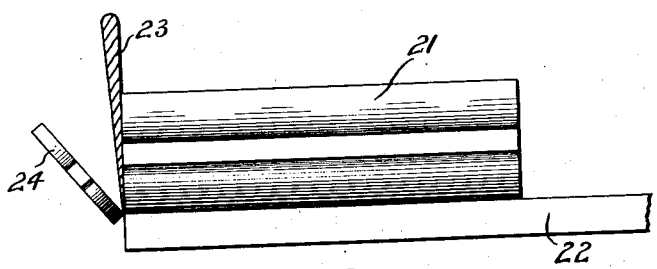
Fig. 6.
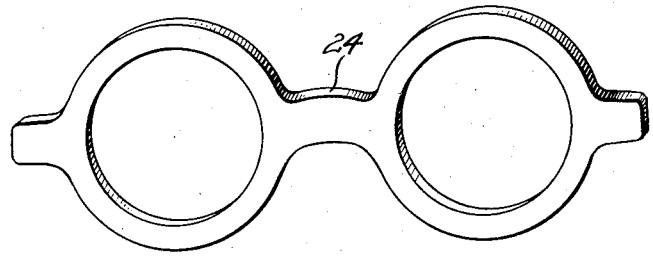
Fig. 7.
INVENTOR
FRANK FRASER.
BY
Harry H. Styll
ATTORNEY Patented Nov. 16, 1926.

1,607,522

UNITED STATES PATENT OFFICE.

FRANK FRASER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BLANK FOR OPHTHALMIC FRAMES AND METHOD OF FORMING THE SAME.

Application filed October 25, 1923. Serial No. 670,679.

The present invention relates to an improved master blank for ophthalmic mountings, and the method or process of forming the same, and has particular reference to composition non-metallic ophthalmic frames, of which celluloid is a typical example.

A very important object of the invention is to provide a master blank from which many smaller or ophthalmic blanks may be made, thus making it possible to make a large number of such smaller blanks all of the same size.

An important object of the invention is to provide means and process for forming ophthalmic blanks of the class described in a much more economical manner than has heretofore been employed, both as to the time involved and the material saved.

Heretofore such frames have been laid out from sheet stock, and after it has been cut therefrom it was required to mill and to remove large portions of the zylonite, which were thrown to the scrap heap. This cellulose composition is a rather expensive product to buy and as only about fifty per cent of the entire sheet was utilized in the construction of the frame, the other fifty per cent was utter waste, thereby increasing the cost of manufacture of such frames.

In the present invention there is absolutely no waste from the original stock in forming the blanks, other than a slight amount that is milled off to give the desired shape and polish to the finished blank.

Another very important object of the invention is to provide means whereby the cellulose composition may be extruded into an elongated blank or sleeve having the general cross section configuration of the finished ophthalmic blank, whereupon after the elongated blank or sleeve has sufficiently cooled and been partially seasoned, if desired, may be cut into the desired thicknesses to form a blank similar to the blanks heretofore cut out of sheet stock.

A still further object of the invention is to provide a method or process of forming a blank as described by means that will so form the elongated blank or sleeve in one operation, thus obviating the necessity of the heating and re-heating and numerous cutting operations that have heretofore been employed.

Other objects and advantages of the invention will become apparent during the course of the following description.

In the drawings, wherein like numerals are employed to designate like parts throughout the same:

Figure 1 is a perspective view illustrating one form of machine used in accordance with my invention.

Figure 2 is a front view of a slight modification thereof.

Figure 3 is a longitudinal section taken on line 3—3 of Figure 2 and looking in the direction of the arrow.

Figure 4 is an end view of another modification of the invention.

Figure 5 is a longitudinal section taken on line 5—5 of Figure 4.

Figure 6 illustrates a step in the process of cutting off the individual blanks from the elongated blanks.

Figure 7 is a perspective view of the ophthalmic blank cut from the elongated blank or sleeve.

In the drawings, wherein for the purpose of illustration is shown the preferred embodiment of my invention, the numeral 10 designates a suitable receptacle or container, in which the cellulose composition is heated either to a molten or plastic state, as is found most desirable. For the sake of illustration a plunger 11 is shown, by which means pressure is brought to bear upon the composition within the container 10, but it is to be understood that any form of pressure may be used with equal results.

In Figure 1 of the drawings the receptacle 10 is shown as being mounted upon an elongated base 12 extending for a considerable distance beyond the front face 13 of the container. A removable plate 14 which is held in place by screws or the like 15 is situated at the lower portion of the front face of the container 10, as is clearly illustrated. The removable plate 14 has formed therein an opening assuming the general configuration of an ophthalmic blank such as is desired in the finished product.

Mounted at the opposite end of the base 12 is a block 16 slidable between the raceways 17 so as to allow of its removal when desired. Of course, a pivoted stop may be mounted at its outer end to prevent displacement when it is desired to maintain the block 16 in a rigid position. Extending longitudinally from the block 16 are two cylindrical cores 18 which are mounted in spaced parallel relation and are adapted to extend within the opening 19 formed in the removable plate 14, as is clearly shown in Figure 1.

The block 16 may be positioned on the guide at the desired distance from the container 10, the cores 18 extending up to the container. After the plastic composition in the container is forced over the cores the composition is allowed to cool and set. The said portion is then cut off close to the face 13 of the container. While the extruded portion is cooling the pressure in the container is removed. After the extruded portion has been cut off the block 16 is moved away from the container on the base 12 and the cut off portion removed. The cores 18 are then pushed back with the block 16 to engage the opening in the container for a second extrusion. It is, of course, understood that the plastic composition in the container is of such a constituency that without pressure being applied it will not flow through the opening in the container.

When pressure is applied to the heated contents of the container 10 the composition is extruded or forced through the opening 19 upon the cores 18, which may be heated as by the electrical means 20, if desired, whereupon the cores 18 and block 16 may be removed when a sufficient length of material 21 has been forced thereon and allowed to cool. It is to be noticed that the opening 19 is restricted when the cores 18 are in place so as to assume the proper shape; that is, the two rings connected by a central web or nose portion, and has the two ribs formed at their outer extremities. When the sleeve or elongated blank 21 has sufficiently cooled or partially seasoned, as desired, it may be removed from the cores 18 and placed upon a block 22 and the desired thickness of blank may be cut off by means of a sharp instrument such as a knife or saw 23, thus forming an excellent ophthalmic blank 24. It is to be understood that this blank 24 may be of any size or shape, which shape is determined by the shape and size of the opening 19 formed in the container. It will thus be seen that various plates 14 having various sized openings may be placed in position and the material extruded therethrough so as to form an elongated blank or sleeve, whereupon after sufficient cooling the sleeve is cut up into blanks without having necessitated the usual waste of material, as has heretofore been experienced.

In Figures 2 and 3 of the drawings a slight modification is shown wherein the same container 10 and plunger 11 are provided. Located within the container 10 is a core 25 which is bolted to the bottom of the container by means of the bolts 26, which shall be of sufficient strength to maintain the core 25 in a rigid position. The core 25 is slightly curved at one end, but is provided with a long longitudinally extending portion as shown so that the outer end will fit within an opening similar to the opening 19 in Figure 1 of the plate 27. It is to be understood that the core 25 does not extend beyond the outer face of the plate 27 so that the composition which has been extruded by means of the pressure introduced as at 11 will glide out upon an endless carrier 28 which is carried by the rollers 29. The action of the extruded material will be sufficient to operate the endless belt 28 if the rollers 29 are adequately lubricated and disposed within suitable bearings. As in the first instance, after the extruded sleeve or elongated blank 21 has sufficiently cooled it may be cut up as shown in Figure 6, thus forming the blank as illustrated in Figure 7.

In Figures 4 and 5 another slight modification is shown, wherein the composition is forced or extruded within a suitable mold formed by the sleeves 30 and 31. The sleeves 30 and 31 are held in parallel spaced relation by means of the outer web portions 32 located at the opposite end of the mold to that in which the composition is forced or extruded, thereby allowing the complete non-metallic blank to be formed with continuous rims, as shown in Figure 5. These sleeves are likewise carried by a removable plate 14 located in the front face of the container 10. The inner end of the sleeve 31 is closed, as by the plate 33, so that the cellulose composition will assume the proper shape as in the other modifications of the invention.

It will thus be seen that I have devised a new means of forming the non-metallic composition ophthalmic blanks, and in so doing have made it possible to save the heretofore excessive wastage of valuable material and time.

In addition to this the tools that have been required to make such frames from sheet stock are extremely expensive, and as they have had to be replaced often an added expense is obtained, thus increasing the cost of manufacture of such blanks. In the present instance, however, the cellulose composition is formed into the desired shape in its initial working, and instead of forming flat sheets and then cutting the blanks from such stock the cellulose composition is extruded into the shape of an elongated blank which may be, after it has sufficiently cooled and seasoned, if desired, cut up into numerous ophthalmic blanks which are ready for shaping and polishing and then use.

It is obvious that many means might be devised for extruding a blank similar to mine, and it is, therefore, to be understood that the form of my invention herewith shown and described is to be taken as the preferred embodiment of the same and that various changes in the size, shape and arrangement of parts may be resorted to without departing from the spirit of my invention or the scope of the sub-joined claims.

What I claim is:

1. A blank of the class described comprising two circular portions, a curved web member interposed between the two circular portions, a rib formed integral with each circular portion and disposed opposite the web portion, said blank being adapted to be cut into ophthalmic blanks.

2. The process of forming an ophthalmic blank of the class described, consisting of heating a quantity of the cellulose composition into a plastic state, forcing the plastic cellulose composition through an opening having the configuration of an ophthalmic mounting, allowing the cellulose composition to partially season after it has been formed, and cutting the same into ophthalmic blanks.

3. A step in the process of forming an ophthalmic blank of the class described consisting of extruding a composition through an opening having the shape of an ophthalmic mounting.

4. A step in the process of forming an ophthalmic blank of the class described consisting of extruding a plastic cellulose composition through an opening having the shape of an ophthalmic mounting.

5. The process of forming an ophthalmic blank consisting of heating a cellulose composition to a plastic state, extruding the composition through an opening having the configuration of an ophthalmic mounting, thus forming an elongated blank and cutting the same into ophthalmic blanks.

6. An article of manufacture comprising a pair of tubes and a cross bar joining them together and integral therewith, said article being of sufficient length and of such a cross sectional contour that it may be subdivided transversely thereof into a plurality of spectacle frame blanks.

7. An article of manufacture comprising a pair of tubes of hardened plastic material and a cross bar joining them together and integral therewith, said article being of sufficient length and of such a cross sectional contour that it may be subdivided transversely thereof into a plurality of spectacle frame blanks.

8. An article of manufacture comprising a pair of tubes of celluloid and a cross bar joining them together and integral therewith, said article being of sufficient length and of such a cross sectional contour that it may be subdivided transversely thereof into a plurality of spectacle frame blanks.

9. An article of manufacture comprising a pair of tubes and a cross bar joining them together and integral therewith, said article being of sufficient length and of such a cross sectional contour that it may be subdivided transversely thereof into a plurality of spectacle frame blanks and a flange on the periphery of each of said tubes extending longitudinally thereof and approximately diametrically opposite said cross bar.

10. The herein described process of manufacturing spectacle frame blanks which consists in forming an article of plastic material with a cross sectional contour like that of a spectacle frame blank and then subdividing the article transversely thereof into a plurality of sections, each of which constitutes a spectacle frame blank.

FRANK FRASER.